United States Patent
Fubuki

(10) Patent No.: US 9,214,846 B2
(45) Date of Patent: Dec. 15, 2015

(54) PERMANENT MAGNET, MOTOR ROTOR OR STATOR, ROTARY ELECTRIC MACHINE

(75) Inventor: Shingo Fubuki, Nisshin (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 692 days.

(21) Appl. No.: 13/259,847

(22) PCT Filed: Feb. 2, 2011

(86) PCT No.: PCT/JP2011/052114
§ 371 (c)(1),
(2), (4) Date: Sep. 23, 2011

(87) PCT Pub. No.: WO2012/105006
PCT Pub. Date: Aug. 9, 2012

(65) Prior Publication Data
US 2012/0194025 A1 Aug. 2, 2012

(51) Int. Cl.
H02K 21/12 (2006.01)
H02K 1/27 (2006.01)
H02K 15/03 (2006.01)
H01F 7/02 (2006.01)

(52) U.S. Cl.
CPC ............... *H02K 15/03* (2013.01); *H01F 7/021* (2013.01); *H02K 1/2766* (2013.01)

(58) Field of Classification Search
CPC ............ H02K 15/03; B26F 3/00; H01F 7/02; B24C 1/00; B24C 1/04
USPC .................. 310/156.01–156.84; 29/596–598
See application file for complete search history.

(56) References Cited

U.S. PATENT DOCUMENTS

| 3,539,853 | A | * | 11/1970 | Gibson et al. | .......... 310/216.065 |
| 6,848,170 | B1 | * | 2/2005 | Damadian et al. | .............. 29/607 |
| 8,510,933 | B2 | * | 8/2013 | Murakami et al. | .............. 29/607 |

(Continued)

FOREIGN PATENT DOCUMENTS

| CN | 101889318 A | 11/2010 | |
| JP | 58095956 A | * 6/1983 | ............... H02K 7/18 |

(Continued)

OTHER PUBLICATIONS

JP 58095956 A English abstract.*

(Continued)

*Primary Examiner* — Dang Le
*Assistant Examiner* — Leda Pham
(74) *Attorney, Agent, or Firm* — Kenyon & Kenyon LLP

(57) ABSTRACT

A permanent magnet includes two or more separate permanent magnet pieces each having a rectangular parallelepiped shape with a fractured surface formed when a permanent magnet block is fractured. The separate permanent magnet pieces include a first separate permanent magnet piece and a second separate permanent magnet piece. At the time when the permanent magnet block is fractured, the first and second separate permanent magnet pieces are adjacently located and a first fractured surface of the first separate permanent magnet piece and a second fractured surface of the second separate permanent magnet piece are adjacent to each other. The permanent magnet is configured such that the first fractured surface of the first separate permanent magnet piece and the second fractured surface of the second separate permanent magnet piece are located in positions out of contact with each other.

11 Claims, 16 Drawing Sheets

(56) References Cited

U.S. PATENT DOCUMENTS

| | | | |
|---|---|---|---|
| 8,747,583 B2* | 6/2014 | Takaichi et al. | 156/60 |
| 2008/0036324 A1* | 2/2008 | Kihara | 310/153 |
| 2010/0244608 A1 | 9/2010 | Nakamura et al. | |

FOREIGN PATENT DOCUMENTS

| | | | | |
|---|---|---|---|---|
| JP | 2002-262490 A | 9/2002 | | |
| JP | 2003-070214 A | 3/2003 | | |
| JP | 2003-134750 A | 5/2003 | | |
| JP | 2003-347142 A | 12/2003 | | |
| JP | 2005-354899 A | 12/2005 | | |
| JP | 2009-033958 A | 2/2009 | | |
| JP | 2009-142081 A | 6/2009 | | |
| JP | 2009-171679 A | 7/2009 | | |
| JP | 4497198 B2 | 4/2010 | | |
| JP | 2010-259231 A | 11/2010 | | |
| KR | 2006088391 | * | 8/2006 | G11B 33/14 |

OTHER PUBLICATIONS

International Search Report of PCT/JP2011/052114 mailed Mar. 8, 2011.

* cited by examiner (1)

MAGNETIC STEEL SHEET FORMING PROCESS (2)

ROTOR CORE MANUFACTURING PROCESS (4)

SEPARATE MAGNET PIECE MOUNTING PROCESS (3)

SEPARATE MAGNET PIECE MANUFACTURING PROCESS (6)

ROTOR SHAFT MOUNTING PROCESS (5)

ROTOR SHAFT MANUFACTURING PROCESS

PERMANENT MAGNET, MOTOR ROTOR OR STATOR, ROTARY ELECTRIC MACHINE

CROSS-REFERENCE TO RELATED APPLICATIONS

This is a 371 national phase application of PCT/JP2011/052114 filed on 2 Feb. 2011, the entire contents of which are incorporated herein by reference.

FIELD OF THE INVENTION

The present invention relates to a permanent magnet including two or more rectangular parallelepiped separate permanent magnet pieces each having a fractured surface formed by fracturing a permanent magnet block.

BACKGROUND OF THE INVENTION

For use in a high-power, concentrated winding motor for HV or the like with a rotor in which large magnetic variations occur, rear earth magnets are fractured to reduce eddy-current loss.

Heretofore, one of this type of permanent magnet is disclosed in Patent Document 1 listed below. A permanent magnet of Patent Document 1 includes, as shown in FIG. 17, a cutting process of dividing a permanent magnet block 101 into separate permanent magnet pieces 102 by machining, a coating process of applying insulation treatment to each permanent magnet piece 102, and a joining magnetic variations occur of joining the separate permanent magnet pieces 102 having been subjected to the insulation treatment to each other with adhesive or the like into one body.

However, the machining performed in the cutting process of a manufacturing method of the permanent magnet in Patent Document 1 requires an expensive cutting tool provided with diamond chips to divide the permanent magnet block 101. The cutting tool is a wear-and-tear product that has to be replaced periodically. Therefore, such an expensive cutting tool with diamond chips is replaced every time it wears down, resulting in a problem with an increased cost. Further, the need to perform the coating process of applying the insulation treatment leads to an increased cost.

For the purpose of reducing the cost to divide the permanent magnet and lower the cost of insulation treatment, the present applicant proposed a manufacturing method including fracturing a permanent magnet according to Patent Document 2 listed below. As shown in FIG. 18, a permanent magnet block 201 is formed with fracturing notches 202 before being divided and then is fractured by a fracturing device 300. Since the permanent magnet block 201 is to be fractured, the block 201 can be divided by the fracturing device 300 using no cutting tool, forming separate permanent magnet pieces. The fractured block 201 not subjected to insulation treatment can provide almost the same effects as in the case where it is subjected to the insulation treatment. As a result, the cost of manufacturing the separate permanent magnet pieces and the cost of insulation treatment could be reduced.

RELATED ART DOCUMENTS

Patent Documents

Patent Document 1: Japanese Patent Application Publication No. 2003-134750
Patent Document 2: Japanese Patent No. 4497198

SUMMARY OF THE INVENTION

Problems to be Solved by the Invention

However, the conventional arts have the following problems. Specifically, the fractured permanent magnet including the separate permanent magnet pieces in Patent Document 2 has a higher residual ratio of magnet eddy loss than a cut permanent magnet having the same number of divisions. This is a major concern. Here, eddy loss (eddy-current loss) represents the loss of electric energy caused by eddy-currents generated when magnetic flux distributes in a magnetic body. For instance, for the number of divisions being 8, a residual ratio of eddy-current loss of a permanent magnet P8 (eight divisions) with cut surfaces placed as contact surfaces is about 30%. In contrast, a residual ratio of eddy-current loss of a permanent magnet Q8 (eight divisions) with fractured surfaces placed as contact surfaces is about 60%, which is twice as large as the above residual ratio. This is because, as shown in FIG. 19, a fractured permanent magnet 400 has fractured surfaces L2 directly joined with each other, but the fractured surfaces L2 are broken-out sections. Since these fractured surfaces L2 are broken-out sections, their contact area is large. This results in an increased residual ratio of eddy-current loss.

Furthermore, a surface oxide film on the cut surface of the cut permanent magnet is 30 nm, whereas a surface oxide film on the fractured surface of the fractured permanent magnet is 7 nm. It is evident from the fractured permanent magnet that the residual ratio of eddy-current loss increased because of a thin surface oxide film.

The present invention has been made to solve the above problems and has a purpose to provide a fractured permanent magnet capable of reducing a residual ratio of magnet eddy loss, a motor rotor or stator including the permanent magnet, and a rotary electric machine using the motor rotor including the permanent magnet.

Means of Solving the Problems (1) To achieve the above purpose, one aspect of the invention provides a permanent magnet including two or more separate permanent magnet pieces each having a rectangular parallelepiped shape with a fractured surface formed when a permanent magnet block is fractured, wherein the separate permanent magnet pieces include a first separate permanent magnet piece and a second separate permanent magnet piece, at the time when the permanent magnet block is fractured, the first and second separate permanent magnet pieces are adjacently located and a first fractured surface of the first separate permanent magnet piece and a second fractured surface of the second separate permanent magnet piece are adjacent to each other, and the permanent magnet is configured such that the first fractured surface of the first separate permanent magnet piece and the second fractured surface of the second separate permanent magnet piece are located in positions out of contact with each other.

(2) To achieve the above purpose, in the permanent magnet set forth in (1), preferably, the first separate permanent magnet piece and the second separate permanent magnet piece are arranged in positions out of contact with each other.

(3) To achieve the above purpose, in the permanent magnet set forth in (1), preferably, the first fractured surface of the first separate permanent magnet piece and the second fractured surface of the second separate permanent magnet piece are located in positions out of contact with each other.

(4) To achieve the above purpose, in the permanent magnet set forth in one of (1) to (3), preferably, the first fractured surface of the first separate permanent magnet piece is located in an outer peripheral surface of the permanent magnet.

(5) To achieve the above purpose, in the permanent magnet set forth in one of (1) to (3), preferably, the fractured surfaces of the two or more separate permanent magnet pieces are located in an outer peripheral surface of the permanent magnet.

(6) To achieve the above purpose, in the permanent magnet set forth in (1), preferably, the fractured surfaces are located in a pair of opposite surfaces of the rectangular parallelepiped shape.

(7) To achieve the above purpose, another aspect of the invention provides a motor rotor or stator in which a rectangular parallelepiped permanent magnet is inserted in a slot, the permanent magnet including two or more separate permanent magnet pieces having fractured surfaces formed when a permanent magnet block is fractured, wherein the fractured surface of at least one of the separate permanent magnet pieces is located in an outer peripheral surface of the permanent magnet.

(8) To achieve the above purpose, in the motor rotor or stator set forth in (7), preferably, the fractured surfaces of the two or more separate permanent magnet pieces are located in the outer peripheral surface of the permanent magnet.

(9) To achieve the above purpose, in the motor rotor or stator set forth in (7) or (8), preferably, the fractured surfaces are located in a pair of opposite surfaces of the rectangular parallelepiped shape.

(10) To achieve the above purpose, another aspect of the invention provides a rotary electric machine using a motor rotor in which a rectangular parallelepiped permanent magnet is inserted in a slot, the permanent magnet including two or more separate permanent magnet pieces having fractured surfaces formed when a permanent magnet block is fractured, wherein the fractured surface of at least one of the separate permanent magnet pieces is located in an outer peripheral surface of the permanent magnet.

(11) To achieve the above purpose, in a rotary electric machine set fort in (10), preferably, the fractured surfaces of the two or more separate permanent magnet pieces are located in the outer peripheral surface of the permanent magnet.

(12) To achieve the above purpose, in a rotary electric machine set fort in (10) or (11), preferably, the fractured surfaces are located in a pair of opposite surfaces of the rectangular parallelepiped shape.

Effects of the Invention

According to the above permanent magnet in (1), in a permanent magnet including two or more separate permanent magnet pieces each having a rectangular parallelepiped shape with a fractured surface formed when a permanent magnet block is fractured, the separate permanent magnet pieces include a first separate permanent magnet piece and a second separate permanent magnet piece, at the time when the permanent magnet block is fractured, the first and second separate permanent magnet pieces are adjacently located and a first fractured surface of the first separate permanent magnet piece and a second fractured surface of the second separate permanent magnet piece are adjacent to each other, and the permanent magnet is configured such that the first fractured surface of the first separate permanent magnet piece and the second fractured surface of the second separate permanent magnet piece are located in positions out of contact with each other. Accordingly, the first fractured surface and the second fractured surface which are fractured surfaces facing each other no longer contact with each other. Since the first and second fractured surfaces do not contact with each other, the contact area of the separate permanent magnet pieces contacting each other is reduced. A residual ratio of magnet eddy loss due to fracture can be reduced.

According to the above permanent magnet in (2), the first separate permanent magnet piece and the second separate permanent magnet piece are arranged in positions out of contact with each other. Accordingly, the first fractured surface and the second fractured surface which are fractured surfaces facing each other no longer contact with each other. Specifically, this is because the order of arrangement of the separate permanent magnet pieces is changed to avoid the first separate permanent magnet piece or the second separate permanent magnet piece from being adjacently located, and therefore the first and second fractured surfaces which face to each other no longer contact with each other.

According to the above permanent magnet in (3), the first fractured surface of the first separate permanent magnet piece and the second fractured surface of the second separate permanent magnet piece are located in positions out of contact with each other. Accordingly, the first fractured surface and the second fractured surface which are fractured surfaces facing each other no longer contact with each other. Specifically, since the orientation of the first separate permanent magnet piece or the second separate permanent magnet piece is changed, the first and second fractured surfaces which face to each other can be placed in positions out of contact with each other.

According to the above permanent magnet in (4), the first fractured surface of the first separate permanent magnet piece is located in an outer peripheral surface of the permanent magnet. Since the fractured surface of at least one of the separate permanent magnet pieces is located in the outer peripheral surface, at least one of the contact surfaces of the magnet pieces is provided by a cut surface formed by a cutting work. The cut surface of at least one of the magnet pieces is in contact with the fractured surface, the contact area of the magnet pieces being in contact with each other is reduced. This can reduce a residual ratio of magnet eddy loss due to fracture can be reduced.

According to the above permanent magnet in (5), the fractured surfaces of the two or more separate permanent magnet pieces are located in an outer peripheral surface of the permanent magnet. Since the fractured surfaces of the permanent magnet are located in the outer peripheral surface, the contact surfaces of the magnet pieces are provided by cut surfaces formed by a cutting work. The cut surfaces are in contact with each other, so that the contact area of the magnet pieces being in contact with each other is reduced and hence a residual ratio of magnet eddy loss due to fracture can be reduced. In addition, the contact surfaces can be the cut surfaces formed by the cutting work and therefore can have a surface oxide film of 30 nm. As a result, the surface oxide film can be made thicker than the contact surface provided by the fractured surface with a surface oxide film of 7 nm. Thus, the residual ratio of magnet eddy loss can be reduced.

According to the above permanent magnet in (6), the fractured surfaces are located in a pair of opposite surfaces of the rectangular parallelepiped shape. This configuration can improve the accuracy of position of the permanent magnet when inserted in a slot. Specifically, if the irregular fractured surfaces are placed in all circumferential surfaces, the fractured surfaces of the permanent magnet are apt to get snagged in the slot and hard to smoothly enter therein. This causes variations in the positions of the permanent magnets. On the other hand, if fractured surfaces are placed in the pair of opposite surfaces, the other pair of surfaces is cut surfaces having no irregularities or asperities. Accordingly, the permanent magnet can be inserted in the slot with reference to the cut surfaces and therefore variations in the positions of the permanent magnets can be reduced. This configuration can improve the positional accuracy of the permanent magnet when inserted in the slot.

According to the motor rotor or stator in (7), in a motor rotor or stator in which a rectangular parallelepiped permanent magnet is inserted in a slot, the permanent magnet including two or more separate permanent magnet pieces having fractured surfaces formed when a permanent magnet block is fractured, the fractured surface of at least one of the separate permanent magnet pieces is located in an outer peripheral surface of the permanent magnet. Since the fractured surface of at least one of the magnet pieces in the motor rotor or stator is placed in the outer peripheral surface, at least one of the contact surfaces of the magnet pieces is a cut surface formed by a cutting work. The cut surface of at least one of the magnet pieces is in contact with the fractured surface, so that the contact area of the magnet pieces being in contact with each other is reduced. A residual ratio of magnet eddy loss due to fracture can therefore be reduced.

According to the motor rotor or stator in (8), the fractured surfaces of the two or more separate permanent magnet pieces are located in the outer peripheral surface of the permanent magnet. Since the fractured surfaces of the permanent magnet in the motor rotor or stator are placed in the outer peripheral surface, the contact surfaces of the magnet pieces are cut surfaces formed by a cutting work. The cut surfaces are in contact with each other, so that the contact area of the magnet pieces being in contact with each other is reduced. A residual ratio of magnet eddy loss can therefore be reduced. The contact surfaces can be the cut surface formed by the cutting work and therefore can have a surface oxide film of 30 nm. As a result, the surface oxide film can be made thicker than the contact surface provided by the fractured surface with a surface oxide film of 7 nm. Thus, the residual ratio of magnet eddy loss can be reduced.

According to the motor rotor or stator in (9), the fractured surfaces are located in a pair of opposite surfaces of the rectangular parallelepiped shape. Therefore, the positional accuracy of the permanent magnet when inserted in the slot of the motor rotor or stator can be improved. Specifically, if the irregular fractured surfaces are placed in all circumferential surfaces, the fractured surfaces of the permanent magnet are apt to get snagged in the slot and hard to smoothly enter therein. This causes variations in the positions of the permanent magnets. On the other hand, if fractured surfaces are placed in the pair of opposite surfaces, the other pair of surfaces is cut surfaces having no irregularities or asperities. Accordingly, the permanent magnet can be inserted in the slot with reference to the cut surfaces and therefore variations in the positions of the permanent magnets can be reduced. This configuration can improve the positional accuracy of the permanent magnet when inserted in the slot.

According to the rotary electric machine in (10), in a rotary electric machine using a motor rotor in which a rectangular parallelepiped permanent magnet is inserted in a slot, the permanent magnet including two or more separate permanent magnet pieces having fractured surfaces formed when a permanent magnet block is fractured, the fractured surface of at least one of the separate permanent magnet pieces is located in an outer peripheral surface of the permanent magnet. Since the fractured surface of at least one of the magnet pieces inserted in the motor rotor or stator of the rotary machine is placed in the outer peripheral surface, at least one of the contact surfaces of the magnet pieces is a cut surface formed by a cutting work. The cut surface of at least one of the magnet pieces is in contact with the fractured surface, so that the contact area of the magnet pieces being in contact with each other is reduced. A residual ratio of magnet eddy loss due to fracture can therefore be reduced.

According to the rotary electric machine in (11), the fractured surfaces of the two or more separate permanent magnet pieces are located in the outer peripheral surface of the permanent magnet. Since the fractured surfaces of the magnet pieces in the motor rotor or stator of the rotary machine are placed in the outer peripheral surface, the contact surfaces of the magnet pieces are cut surfaces formed by a cutting work. The cut surfaces are in contact with each other, so that the contact area of the magnet pieces being in contact with each other is reduced and hence a residual ratio of magnet eddy loss due to fracture can be reduced. In addition, the contact surfaces can be the cut surfaces formed by the cutting work and therefore can have a surface oxide film of 30 nm. As a result, the surface oxide film can be made thicker than the contact surface provided by the fractured surface with a surface oxide film of 7 nm. Thus, the residual ratio of magnet eddy loss can be reduced.

According to the rotary electric machine in (12), the fractured surfaces are located in a pair of opposite surfaces of the rectangular parallelepiped shape. Therefore, the positional accuracy of the permanent magnet when inserted in the slot of the motor rotor or stator can be improved. Specifically, if the irregular fractured surfaces are placed in all circumferential surfaces, the fractured surfaces of the permanent magnet are apt to get snagged in the slot and hard to smoothly enter therein. This causes variations in the positions of the permanent magnets. On the other hand, if fractured surfaces are placed in the pair of opposite surfaces, the other pair of surfaces is cut surfaces having no irregularities or asperities. Accordingly, the permanent magnet can be inserted in the slot with reference to the cut surfaces and therefore variations in the positions of the permanent magnets can be reduced. This configuration can improve the positional accuracy of the permanent magnet when inserted in the slot.

DETAILED DESCRIPTION

A detailed description of a preferred embodiment of a manufacturing method of a permanent magnet embodying the present invention will now be given referring to the accompanying drawings. Explanations are sequentially made on a whole configuration of a rotor using a permanent magnet, the permanent magnet to be inserted in the rotor, a method of manufacturing the rotor including the permanent magnet, and the operations and effects of the permanent magnet.

First Embodiment

<Whole Configuration of Rotor>

Figure 6:
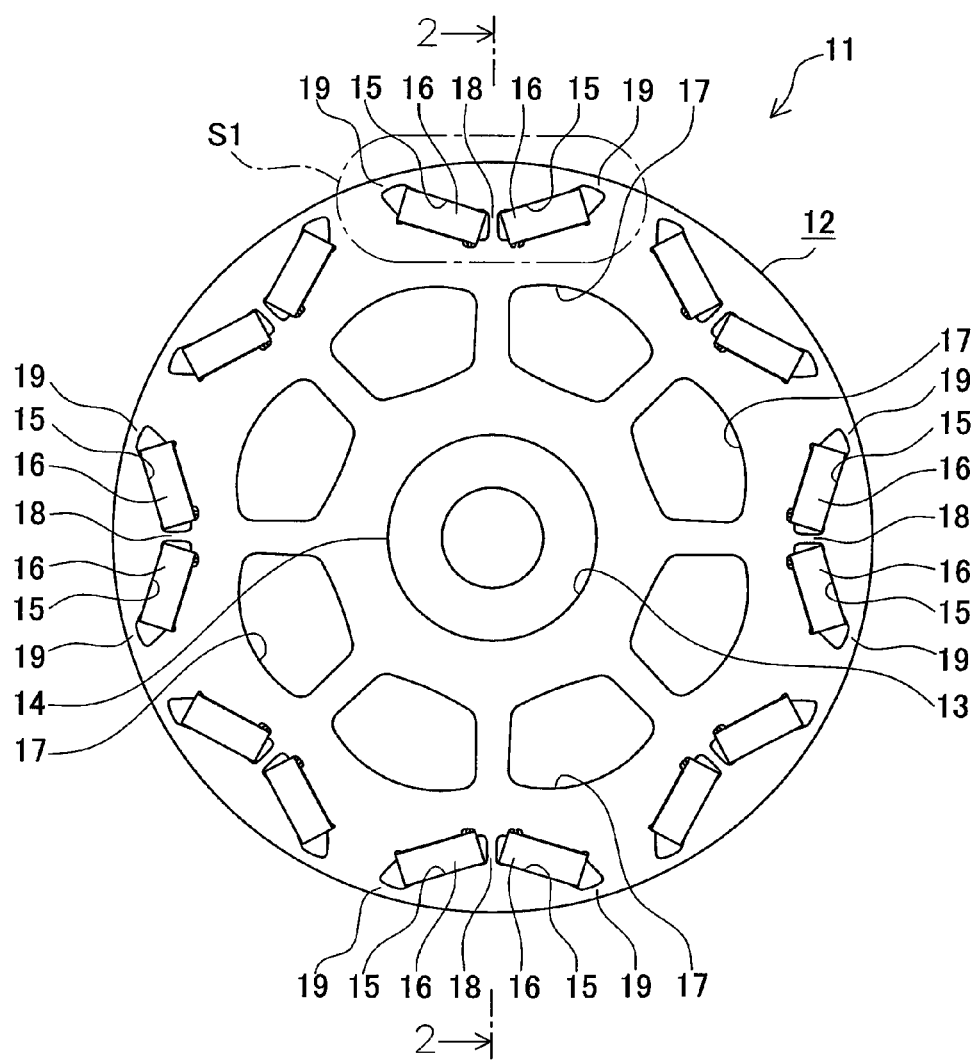
FIG. 6 is a plan view of a rotor of the first embodiment.
Figure 7:
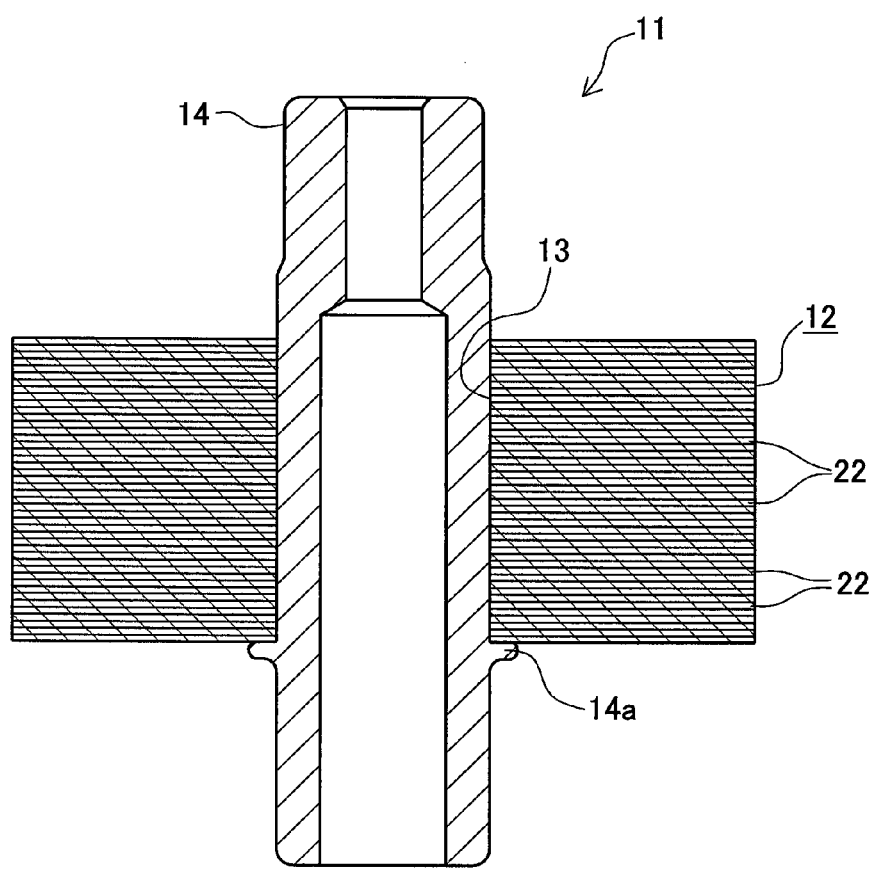
FIG. 7 is a cross sectional view of the rotor of the first embodiment, taken along a line 2-2 in FIG. 6.

FIG. 6 is a plan view of a motor rotor 11 in this embodiment. FIG. 7 is a cross sectional view of the rotor 11 taken along a line 2-2 in FIG. 6. As shown in FIGS. 6 and 7, this rotor 11 includes a rotor core 12 of an almost columnar shape, a single shaft-fixing hole 13 formed at the center of the rotor core 12, and a rotor shaft 14 inserted in the hole 13.

In this embodiment, as shown in FIG. 7, the rotor core 12 consists of a plurality of magnetic steel sheets 22 in a laminated configuration. As shown in FIG. 6, a plurality of slots 15 is formed on an outer circumferential side of the rotor core 12 and at equal angular intervals. Each slot 15 extends through the rotor core 12 in its axial direction. The slots 15 are arranged along the outer peripheral edge of the rotor core 12 so that each two adjacent slots 15 are arranged in a V-shaped or reversed V-shaped pattern. In each slot 15, a permanent magnet 16 for a magnetic field system is inserted and fixed. The rotor core 12 is formed with a plurality of lightening holes 17 circumferentially arranged around the shaft-fixing hole 13 and between the hole 13 and the slots 15. Each lightening hole 17 is of an almost trapezoidal shape in plan view and extends through the rotor core 12 in its axial direction.

As shown in FIGS. 6 and 7, the rotor shaft 14 is of a cylindrical shape and formed, on its outer periphery, with a flange 14a engageable with the rotor core 12. In this embodiment, the rotor shaft 14 is made of metal by forging. The rotor shaft 14 is inserted in the shaft-fixing hole 13 of the rotor core 12 by transition-fitting or press-fitting.

Figure 8:
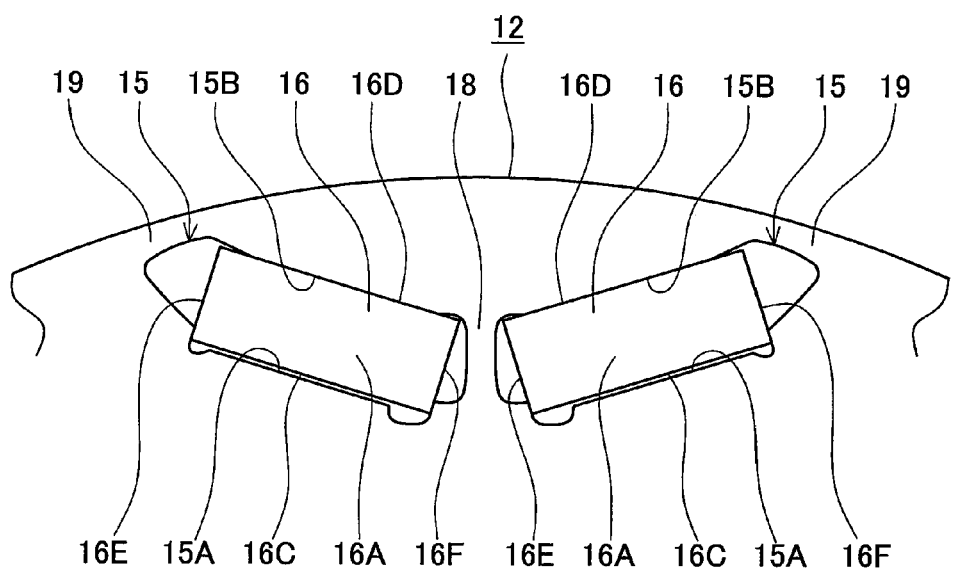
FIG. 8 is an enlarged plan view of separate permanent magnet pieces circled with a chain line shown in FIG. 6 in the rotor of the first embodiment.

FIG. 8 is an enlarged plan view of the permanent magnets 16 of the motor rotor 11 circled with a chain line S1 in FIG. 6.

Between two slots 15 adjacently arranged in a "reversed V-shaped pattern", a first bridge portion 18 is formed as a wall portion that partitions the slots 15. In addition, a second bridge portion 19 is formed as a wall portion between each slot 15 and the outer peripheral edge of the rotor core 12. To constitute a rotary electric machine 40 shown in FIG. 16, the motor rotor 11 is mounted in a stator 41. In this state, in order to place the permanent magnets 16 one in each slot 15 close to the stator located around the rotor 11, the width of each second bridge portion 19 has to be minimized. The permanent magnets 16 are inserted one in each slot 15 and fixed therein with adhesive or the like.

Figure 9:
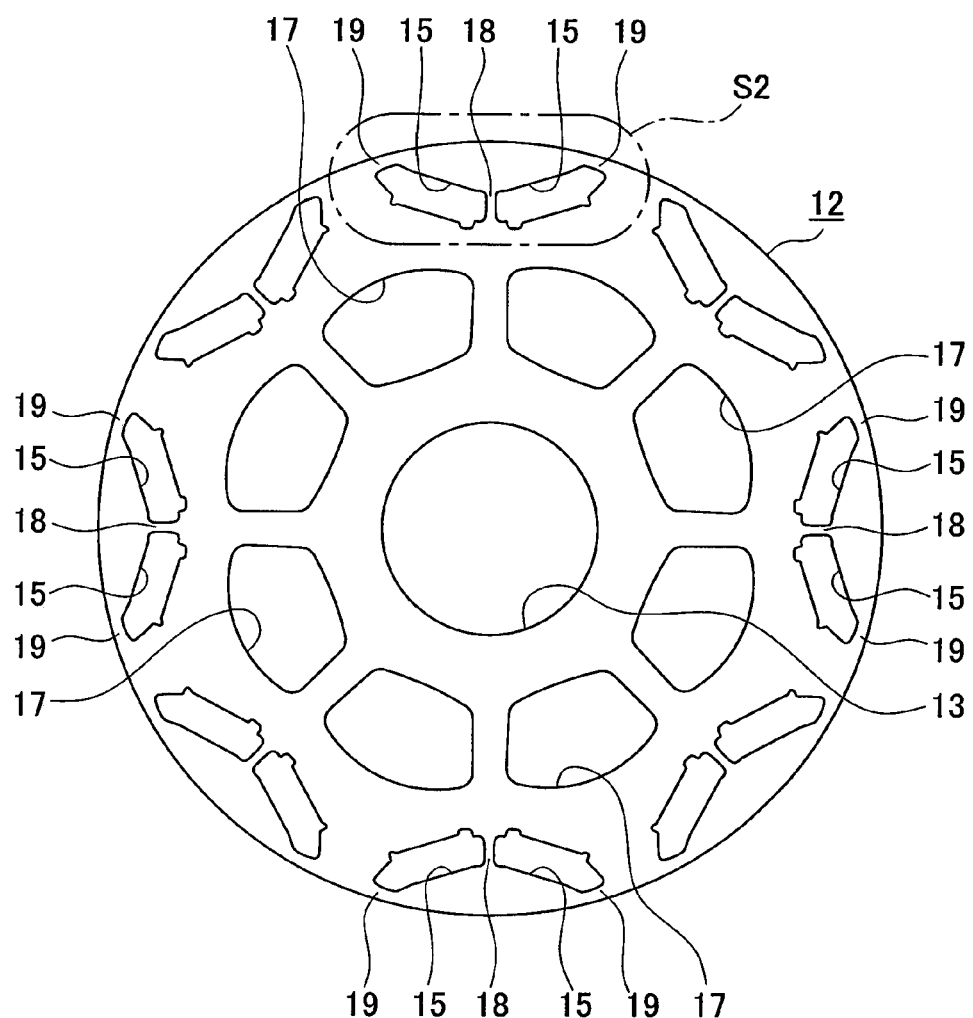
FIG. 9 is a plan view of a rotor core before the separate permanent magnet pieces of the first embodiment are mounted.
Figure 10:
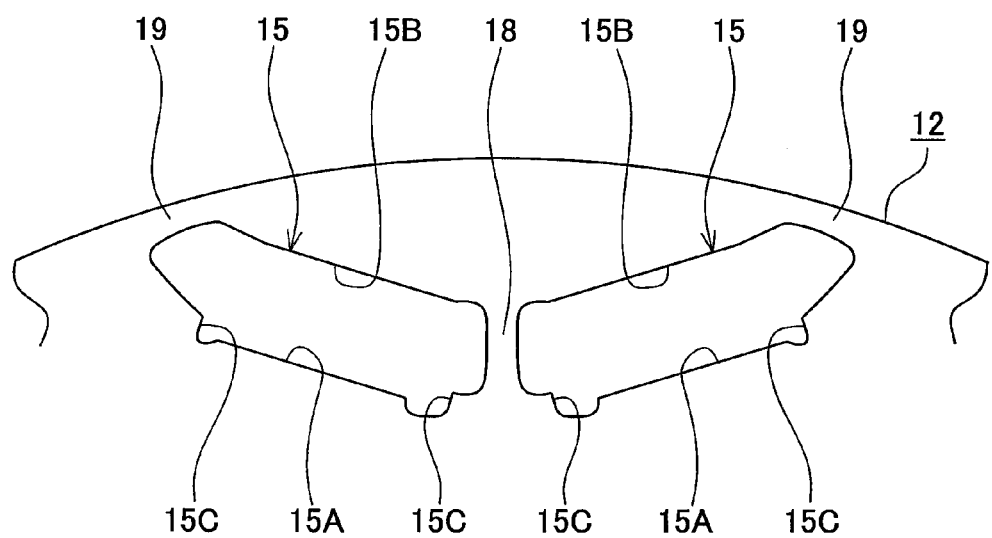
FIG. 10 is an enlarged plan view of slots circled with a chain line shown in FIG. 9 in the rotor core of the first embodiment.

FIG. 9 is a plan view of the rotor core 12 before the rotor shaft 14 and the permanent magnets 16 are mounted therein. FIG. 10 is an enlarged plan view of the slots 15 of the rotor core 12 circled with a chain line S2 in FIG. 9.

<Whole Configuration of Rotary Electric Machine>

Figure 16:
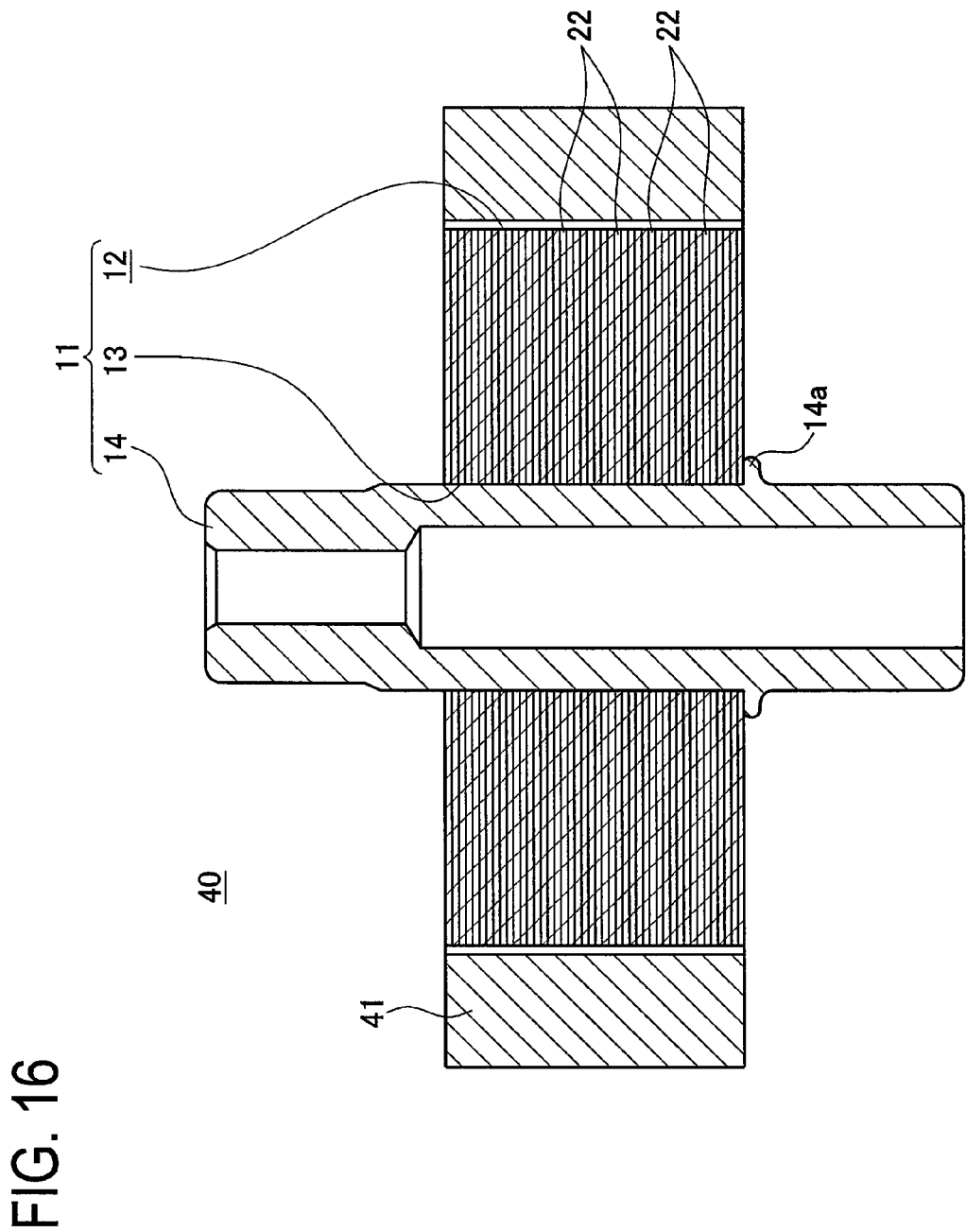
FIG. 16 is a cross sectional view of a rotary electric machine in the embodiments.
Figure 17:
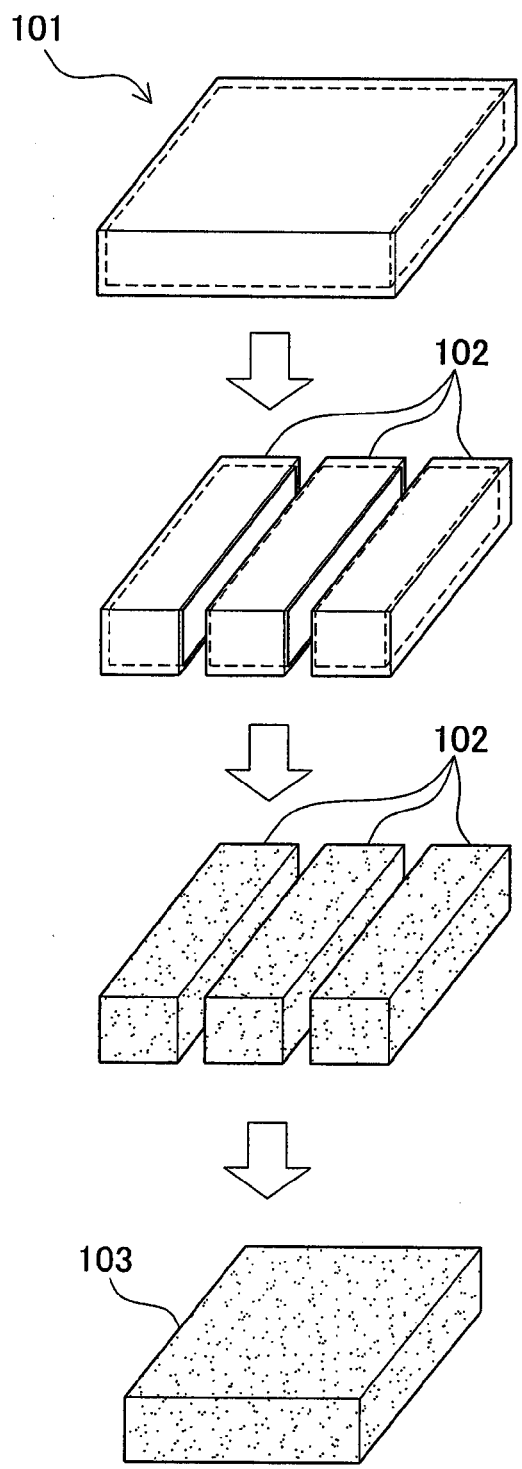
FIG. 17 is a conceptual diagram (1) of a manufacturing process of a conventional permanent magnet.

FIG. 16 is a cross sectional view of the rotary electric machine 40. This machine 40 shown in FIG. 16 is configured such that the motor rotor 11 shown in FIG. 7 is mounted in the stator 41 and a cover (not shown) is formed on the outer periphery of the stator 41. The rotary electric machine 40 using the motor rotor 11 is identical to the conventional art excepting the rotor 11. The details thereof are therefore omitted. Such a rotary electric machine 40 including the rotor 11 can provide the same operations and effects as those of the rotor 11.

<Configuration of Permanent Magnet>

Figure 1:
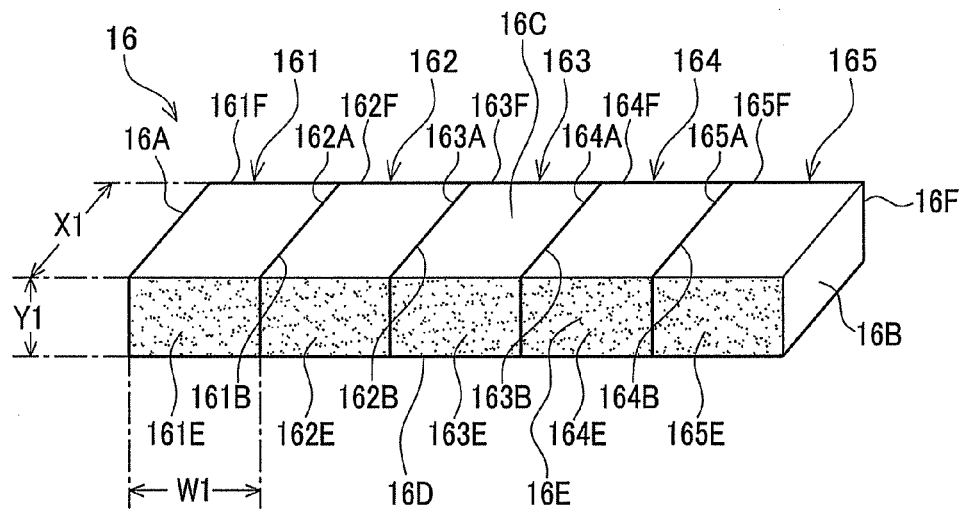
FIG. 1 is an external perspective view of a permanent magnet of a first embodiment.

FIG. 1 is an external perspective view of the permanent magnet 16. In this embodiment, as shown in FIG. 1, the permanent magnet 16 includes separate permanent magnet pieces ("magnet pieces") 161 to 165. The permanent magnet 16 has a rectangular parallelepiped shape having six faces; a face A ("A-face") 16A, a face B ("B-face") 16B, a face C ("C-face") 16C, a face D ("D-face") 16D, a face E ("E-face") 16E, and a face F ("F-face") 16F. A face appearing at the top of the rotor core 12 in FIG. 8 is the A-face 16A and a face appearing at the bottom of the rotor core 12 but not shown in FIG. 8 is the B-face 16B. The C-face 16C, D-face 16D, E-face 16E, and F-face 16F face the side-circumferential wall surface of the slot 15.

The E-face 16E and the F-face 16F of the permanent magnet 16 of the present embodiment shown in FIG. 1 are fractured surfaces. The E-face 16E shown in FIG. 1 is illustrated with a dot pattern to facilitate understanding that the E-face 16E is a fractured surface. The other four faces; A-face 16A, B-face 16B, C-face 16C, and D-face 16D are cut surfaces.

As shown in FIG. 1, the magnet pieces 161 and 162 are placed so that respective contact surfaces 161B and 162A contacting with each other are both cut surfaces. Further, the magnet pieces 162 and 163 are placed so that respective contact surfaces 162B and 163A contacting with each other are both cut surfaces. In addition, other magnet pieces 163, 164, and 165 are also placed so that respective contact surfaces are cut surfaces.

In the present embodiment, fractured surfaces of the magnet pieces 161 and others are located in an outer peripheral surface of the permanent magnet 16, whereas a fractured surface of at least one of the magnet pieces 161 and others may be located in the outer peripheral surface of the permanent magnet 16. Since the fractured surface of at least one of the magnet pieces 161 and others is placed in the outer peripheral surface of the permanent magnet 16, at least one of the contact surfaces of the magnet pieces is a cut surface formed by a cutting work. When the cut surface of at least one of the magnet pieces are in contact with the fractured surface, the contact area of the magnet pieces contacting with each other is reduced. Thus, a residual ratio of magnet eddy loss due to fracture can be reduced.

<Method of Manufacturing Rotor>

Figure 11:
FIG. 11 is a flowchart showing a manufacturing method of the rotor of the first embodiment.
Figure 11:
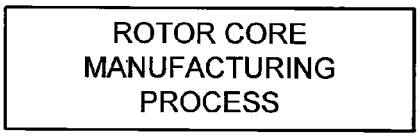
Figure 11:
Figure 11:
Figure 11:
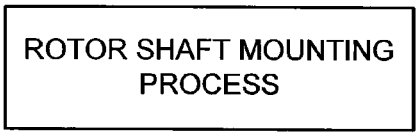
Figure 11:
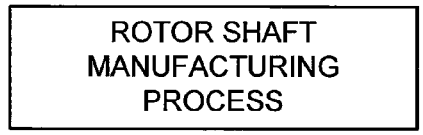

Next, a method of manufacturing the motor rotor 11 and the permanent magnet 16 to be inserted in the rotor 11 will be described. FIG. 11 is a flowchart showing the manufacturing method of the rotor 11.

Figure 12:
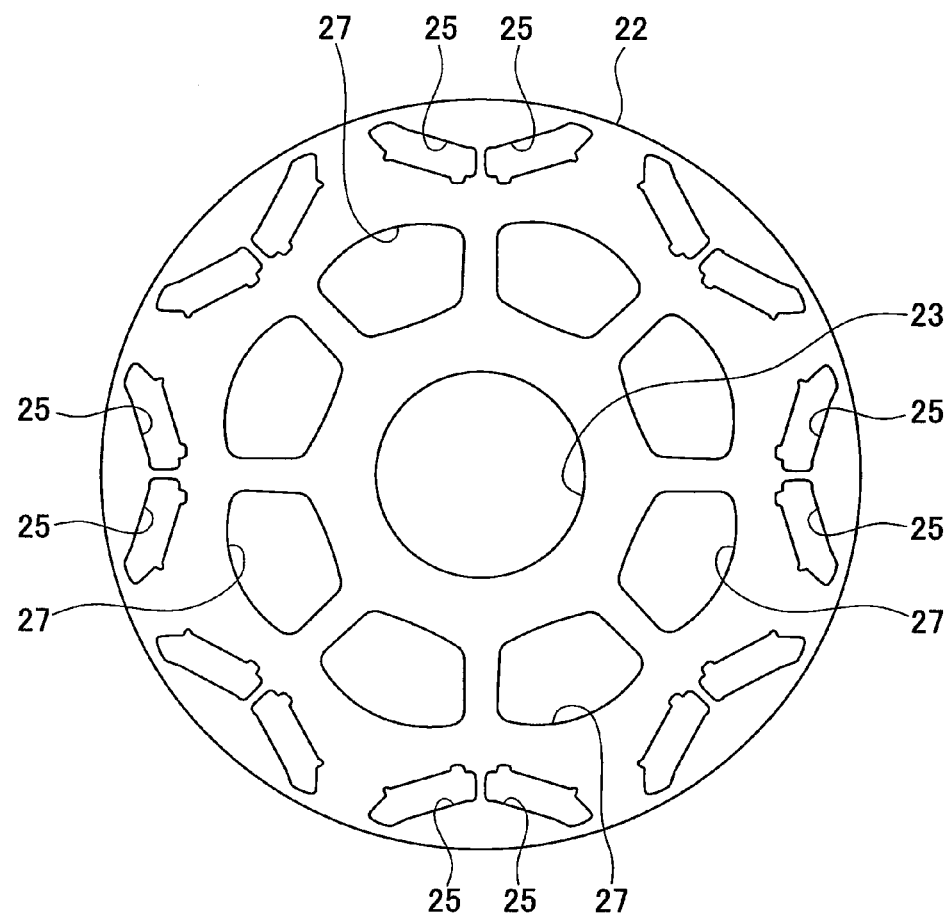
FIG. 12 is a plan view showing one magnetic steel sheet formed in the first embodiment.

In a "magnetic steel sheet forming process" in (1) of FIG. 11, a plurality of magnetic steel sheets 22 is formed with the same shape as each other. FIG. 12 is a plan view of one of the formed magnetic steel sheets 22. Specifically, this steel sheet 22 is made of a thin sheet with a thickness of about 0.3 mm by press. As shown in FIG. 12, this steel sheet 22 has a circular outer shape and is formed with a plurality of holes 25 for constituting the slots 15. The holes 25 are arranged on an outer circumferential side of the steel sheet 22 at equal angular intervals. The steel sheet 22 is further formed, at its center, with a single central hole 23 corresponding to the shaft-fixing hole 13. In the steel sheet 22, a plurality of middle holes 27 corresponding to the lightening holes 17 are formed between the central hole 23 and the slot holes 25.

In a "rotor core manufacturing process" in (2) of FIG. 11, the rotor core 12 is manufactured by laminating the magnetic steel sheets 22 formed in the above process. At that time, the magnetic steel sheets 22 are laminated so that the central hole 23, slot holes 25, and middle holes 27 of each magnetic steel sheet 22 are aligned with those of the vertically adjacent magnetic steel sheets 22.

In a "separate permanent magnet piece manufacturing process" in (3) of FIG. 11, a plurality of permanent magnets 16 is manufactured. The contents of this process are explained referring to a flowchart in FIG. 13.

<Method of Manufacturing Permanent Magnet>

Figure 13:
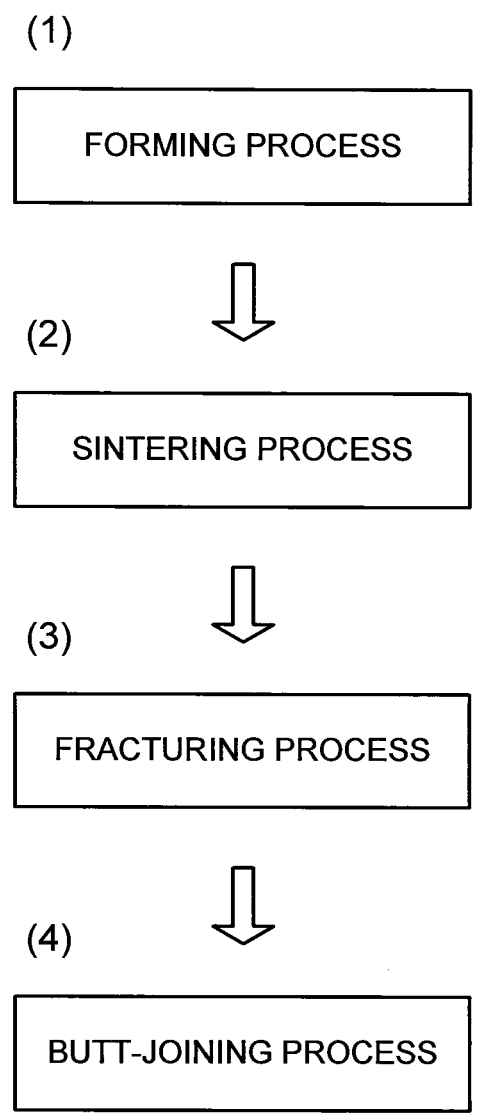
FIG. 13 is a flowchart showing the contents of a "separate permanent magnet piece manufacturing process" in the first embodiment.

In a "forming process" in (1) of FIG. 13, a magnet material is formed into a rectangular parallelepiped shape by a known method. This process can also make a plurality of products at a time. In a "sintering process" in (2) of FIG. 13, the products are sintered to manufacture a plurality of permanent magnet blocks 31.

Figure 2:
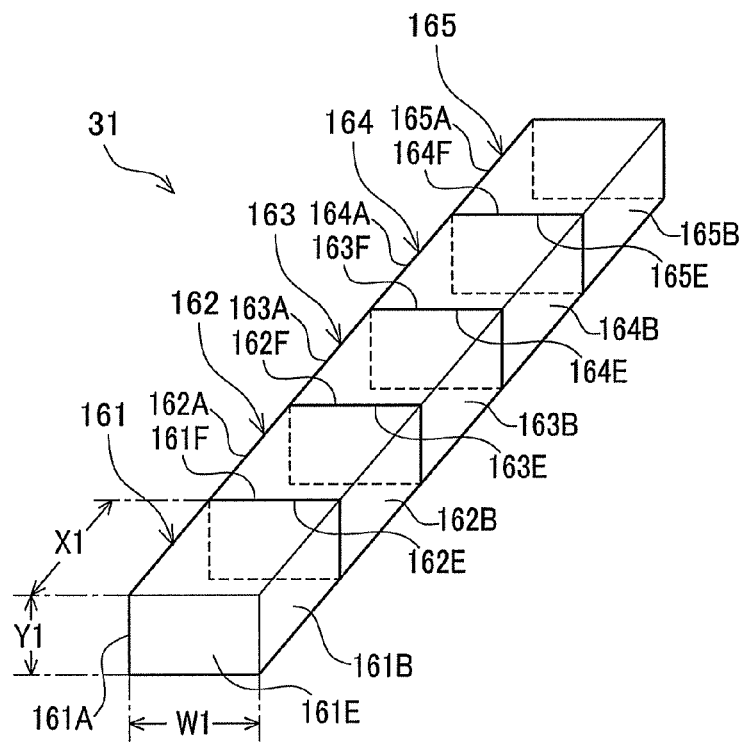
FIG. 2 is an external perspective view of a permanent magnet block of the first embodiment.
Figure 5:
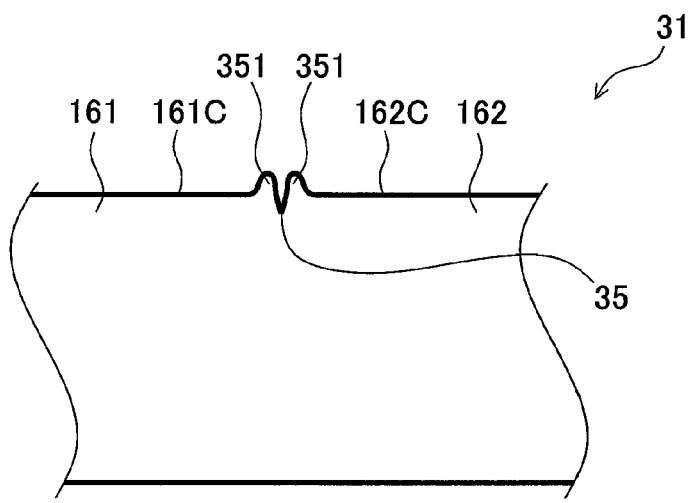
FIG. 5 is a conceptual diagram showing a dividing process (1) of the permanent magnet block of the first embodiment.

In a "fracturing process" in (3) of FIG. 13, each permanent magnet block 31 is fractured into a plurality of separate permanent magnet pieces 161, 162, 163, 164, and 165 as shown in a perspective view in FIG. 2. To be concrete, each permanent magnet block 31 is subjected to laser irradiation at a portion for dividing the magnet pieces 161 and 162, thereby forming a fracturing notch 35 as shown in FIG. 5. Forming the notch 35 enables identifying of a portion to be fractured. Accordingly, uniform magnet pieces 161 and 162 can be formed. Although only the magnet pieces 161 and 162 are mentioned for the above dividing method, other magnet pieces are also obtained by the same fracturing method.

Figure 4:
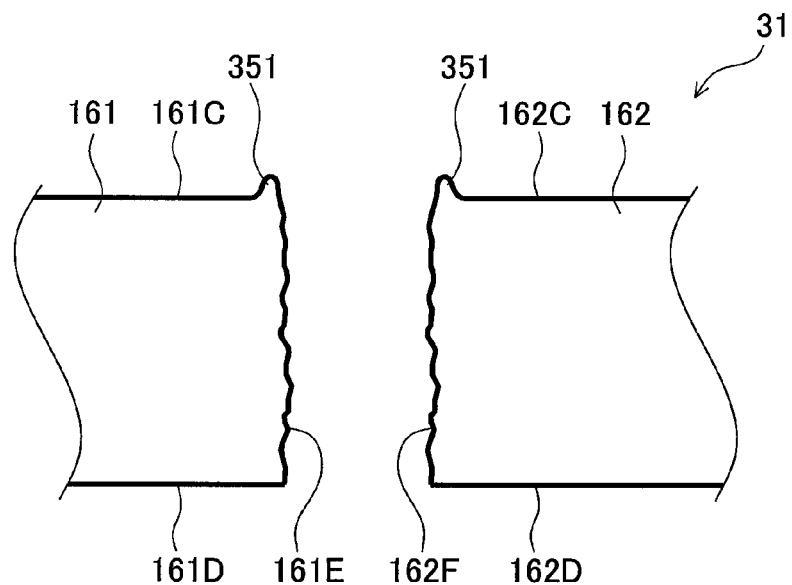
FIG. 4 is a conceptual diagram showing a dividing process (2) of the permanent magnet block of the first embodiment.

When the notch 35 is formed by laser irradiation as shown in FIG. 5, however, protruding marks 351 each raised by a predetermined height are generated respectively on a protrusion-formed surface 161C of the magnet piece 161 and a protrusion-formed surface 162C of the magnet piece 162 located on both sides of the notch 35. These protruding marks 351 are raised-portions generated when the permanent magnet block 31 is melted into an oxidation state by high heat of a laser. The height of each raised portion is estimated to be about 10 µm. It is to be noted that FIGS. 4 and 5 show the protruding marks 351 in an enlarged form for facilitating viewing of each mark 351.

The magnet pieces 161 and 162 on both sides of the notch 35 are pressurized downward, thereby dividing one permanent magnet block 31 into a plurality of magnet pieces 161 and 162 as shown in FIG. 2. Dividing the permanent magnet block 31 by fracturing does not use a cutting tool conventionally required to cut a permanent magnet block 31. As a result, an expensive cutting tool with diamond chips, conventionally required to divide a permanent magnet block 31, is no longer necessary, leading to a reduced cost. Other magnet pieces 163, 164, and 165 are similarly obtained by fracturing.

In a "butt-joining process" in (4) of FIG. 13, thereafter, the magnet pieces 161, 162, 163, 164, and 165 adjacently located as shown in FIG. 2 are arranged so that their fractured surfaces are oriented to the E-face 16E, and F-face 16F of the permanent magnet 16. In the present embodiment, the orientations of the magnet pieces 161, 162, 163, 164, and 165 are changed to place the fractured surfaces in the E-face 16E and F-face 16F of the permanent magnet 16 as shown in FIG. 1. Specifically, in FIG. 1, a fractured surface 161E of the magnet piece 161, a fractured surface 162E of the magnet piece 162, a fractured surface 163E of the magnet piece 163, the fractured surface 164E of the magnet piece 164, and a fractured surface 165E of the magnet piece 165 are positioned in the E-face 16E of the permanent magnet 16. Further, a fractured surface 162F of the magnet piece 162, a fractured surface 163F of the magnet piece 163, and a fractured surface 164F of the magnet piece 164 are positioned in the F-face 16F of the permanent magnet 16. In the case where a single permanent magnet block 31 is fractured, both end parts thereof, i.e., the magnet pieces 161 and 165 each have a single fractured surface. In the present embodiment, fractured surfaces 161E and 165E of the magnet pieces 161 and 165 are located in the E-face 16E of the permanent magnet 16. Therefore, fractured surfaces 161F and 165F of the magnet pieces 161 and 165 are located in the F-face 16F.

In addition, cut surfaces of the magnet pieces 161, 162, 163, 164, and 165 are placed as mutual contact surfaces. In the present embodiment, as shown in FIG. 1, for the contact surfaces of the magnet pieces 161 and 162, a cut surface of the magnet piece 161, i.e., the contact surface 161B, and a cut surface of the magnet piece 162, i.e., the contact surface 162A, are placed to contact with each other. Further, as the contact surfaces of the magnet pieces 162 and 163, the contact surfaces of the magnet pieces 163 and 164, and the contact surfaces of the magnet pieces 164 and 165, respective cut surfaces are placed in a similar manner to the above.

Further, the protrusion-formed surfaces 161C, 162C, 163C, 164C, and 165C, each being formed with the protruding marks 351, of the magnet pieces 161, 162, 163, 164, and 165 are placed to form the C-face 16C of the permanent magnet 16 in FIG. 1. In FIG. 1, the protruding marks are not illustrated but they are present in the protrusion-formed surfaces 161C, 162C, 163C, 164C, and 165C.

In FIG. 1, the size of the permanent magnet 16 is defined as "Magnet width X1"ד"Magnet thickness Y1"ד"Division width W1"ד"Number of divisions: 5"). On the other hand, the size of the permanent magnet block 31 is defined as ("Magnet width X1"ד"Number of divisions: 5")ד"Magnet thickness Y1"ד"Division width W1". In the present embodiment, therefore, it is necessary for manufacturing the permanent magnet 16 to make a permanent magnet block 31 having the size defined by interchanging the magnet width X1 and the division width W1 of the permanent magnet 16. Although the permanent magnet block 31 is manufactured with the size defined by interchanging the magnet width X1 and the division width W1 in the present embodiment, the permanent magnet 16 can also be manufactured with the same size as that shown in FIG. 1 even from a permanent magnet block 31 having the magnet thickness Y1 and the division width W1 interchanged from the above ones.

The "separate permanent magnet piece manufacturing process" in (3) of FIG. 11 can be performed in parallel to each aforementioned process shown in FIG. 11 for manufacturing the rotor.

In a "separate permanent magnet piece assembling process" in (4) of FIG. 11 after manufacturing the permanent magnet, the permanent magnets 16 shown in FIG. 1 are fitted and fixed one in each slot 15 of the rotor core 12 manufactured in the above processes and shown in FIG. 10. In other words, as shown in FIG. 8, the permanent magnets 16 are inserted and fixed one in each slot 15 of the rotor core 12.

Each permanent magnet 16 is inserted, with each B-face 16B in the lead, into a corresponding slot 15 in a vertical direction in FIG. 10. Each slot 15 has an inner-circumferential wall surface 15A, an outer-circumferential wall surface 15B, and side-circumferential wall surfaces 15C as shown in FIG. 10. The concrete inserting position of each permanent magnet 16 is as shown in FIG. 8. Specifically, the C-face 16C of the permanent magnet 16 is positioned to face the inner-circumferential wall surface 15A, the D-face 16D is positioned to face the outer-circumferential wall surface 15B, and the E-face 16E and the F-face 16F are positioned to face the side-circumferential wall surfaces 15C. At that time, an adhesive or the like may be interposed between the permanent magnets 16 and the slots 15.

As the E-face 16E and the F-face 16F respectively facing the side-circumferential wall surfaces 15C, the fractured surfaces are positioned. Since the fractured surfaces of each permanent magnet 16 are placed as the faces contacting with the side-circumferential wall surfaces 15C of each slot 15, the accuracy of position of the permanent magnets 16 when inserted in the slots 15 can be improved. If irregular fractured surfaces are located as all the circumferential surfaces of each permanent magnet 16, the permanent magnets 16 are not inserted smoothly into the slots 15, resulting in variations in the positions of the permanent magnets 16. In contrast, when the fractured surfaces are located as a pair of opposite faces, the other pair of faces is cut surfaces with no irregularities or asperities. Accordingly, the permanent magnets 16 can be inserted one in each slot 15 with reference to respective cut surfaces. This can reduce variations in the positions of the permanent magnets 16. As a result, the positional accuracy of the permanent magnets 16 when inserted in the slots 15 can be improved.

Further, the protruding marks 351 on the C-face 16C of the permanent magnet 16 are located to face the inner-circumferential wall surface 15A positioned on an inner circumferential side of the slot 15 in a radial direction of the rotor 11.

In a "rotor shaft manufacturing process" in (5) of FIG. 11, the rotor shaft 14 is manufactured by a known method. This process can be performed in parallel with each aforementioned process for manufacturing the rotor.

In a "rotor shaft assembling process" in (6) of FIG. 11, the rotor shaft 14 is mounted in the shaft-fixing hole 13 of the rotor core 12 by transition-fitting or press-fitting. Thus, the motor rotor 11 can be manufactured as shown in FIG. 11.

<Operations and Effects of Permanent Magnet>

As shown in FIG. 1, the permanent magnet 16 is configured such that the fractured surfaces of the adjacent magnet pieces 161, 162, 163, 164, and 165 are positioned in the E-face 16E, and F-face 16F which are outer peripheral surfaces of the permanent magnet 16. Accordingly, the contact surfaces of the magnet pieces are defined by the cut surfaces formed by a cutting work. Since the cut surfaces are in contact with each other, the contact area of the magnet pieces contacting with each other is reduced. Thus, a residual ratio of magnet eddy loss due to fracture can be reduced.

Since the cut surfaces formed by the cutting work can be placed as the contact surfaces of the magnet pieces 161, 162, 163, 164, and 165, the surface oxide film is 30 nm thick. As a result, the surface oxide film can be made thicker than 7 nm of the surface oxide film on the contact surfaces provided by the fractured surfaces. Thus, the residual ratio of magnet eddy loss can be reduced. In other words, the surface oxide film can be increased by about four times. The present applicant experimentally confirmed that the residual ratio of magnet eddy loss tends to decrease as the surface oxide film increases.

Figure 3:
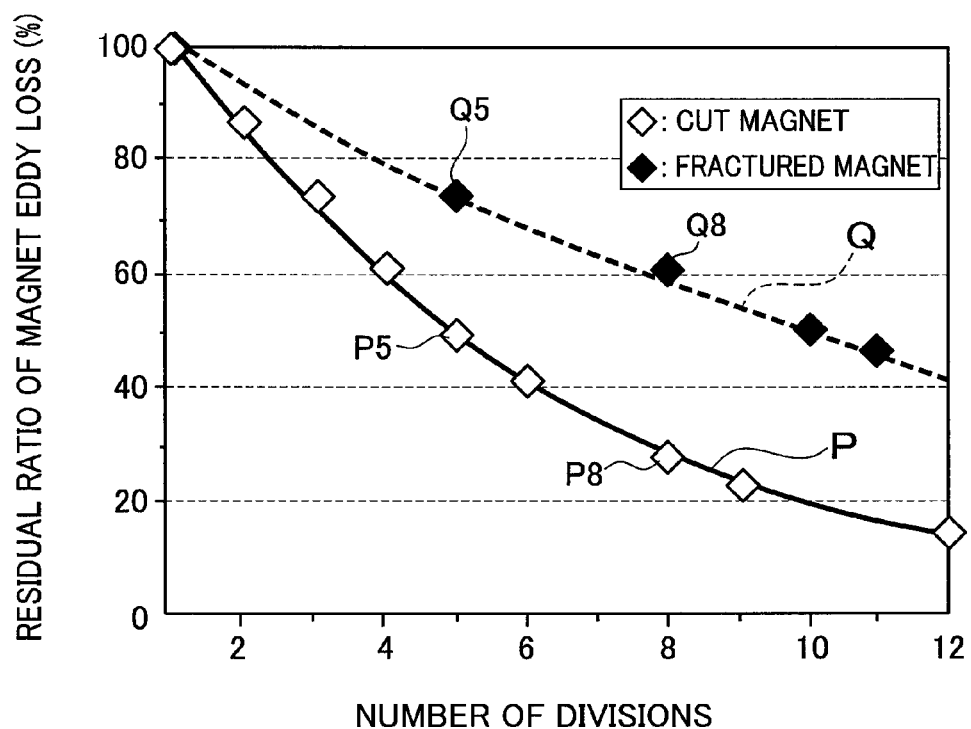
FIG. 3 is a graph showing a relationship between the number of divisions and a residual ratio of magnet eddy loss of the permanent magnet of the first embodiment.

The reduction in the contact area of the magnet pieces contacting with each other and the increase in thickness of the surface oxide film can achieve the effects concretely shown in FIG. 3. FIG. 3 is a graph showing a relationship between the number of divisions and the residual ratio of magnet eddy loss, in which the lateral axis represents the number of divisions and the vertical axis represents the residual ratio of magnet eddy loss (%). A solid line P indicates a residual ratio of magnet eddy loss of a permanent magnet with cut surfaces placed as the contact surfaces and a dotted line Q indicates a residual ratio of magnet eddy loss of a permanent magnet with fractured surfaces placed as the contact surfaces.

Each permanent magnet 16 is configured such that the cut surfaces of the magnet pieces 161, 162, 163, 164, and 165 coated with an insulation coating film are positioned as the contact surfaces. This configuration can provide the effect shown by the solid line P in FIG. 3. Specifically, as shown by P5 indicating that the number of divisions is 5 in the present embodiment, the residual ratio of magnet eddy loss can be kept down to about 50%. Q5 indicating the fractured permanent magnet results in a residual ratio of magnet eddy loss of about 70%. Thus, the present embodiment can reduce the residual ratio of magnet eddy loss by about 20%. Although the present embodiment exemplifies that the number of divisions is 5, the present applicant experimentally confirmed that another configuration with an increased number of divisions can achieve the same effects as shown in FIG. 3.

Further, the fractured surfaces are located in the E-face 16E and the F-face 16F facing the side-circumferential wall surfaces 15C. The fractured surfaces of the permanent magnet 16 are in the faces contacting the side-circumferential wall surfaces 15C of the slot 15 and therefore the positional accuracy of the permanent magnet 16 in the slot 15 can be improved. The fractured surfaces have asperities; different from the cut surfaces formed by the cutting work. Because of the asperities, each fractured surface can have many support points on the inner wall of the slot 15. For this reason, the permanent magnets 16 can have improved accuracy of position in the slots 15. In a case where the E-face and the F-face of each permanent magnet and the side-circumferential wall surfaces of each slot 15 have high surface accuracy, all faces may have support points, whereas costs for enhancing the surface accuracy are liable to increase. According to the present embodiment with the asperities on the fractured surface being used as the support points, the costs can be kept low. Further, with low costs, the positional accuracy of the permanent magnets 16 in the slots 15 can be enhanced.

Second Embodiment

A permanent magnet of a second embodiment is different only in the locations of the magnet pieces 161 and 165 from those of the permanent magnet 16 of the first embodiment. The second embodiment has no difference excepting the locations of the magnet pieces from those in the permanent magnet of the first embodiment. Thus, the second embodiment is described about the permanent magnet without explaining other parts.

Even though other parts are not explained, the second embodiment can provide the same operations and effects as those in the first embodiment.

(Modified Example of Permanent Magnet)

Figure 14:
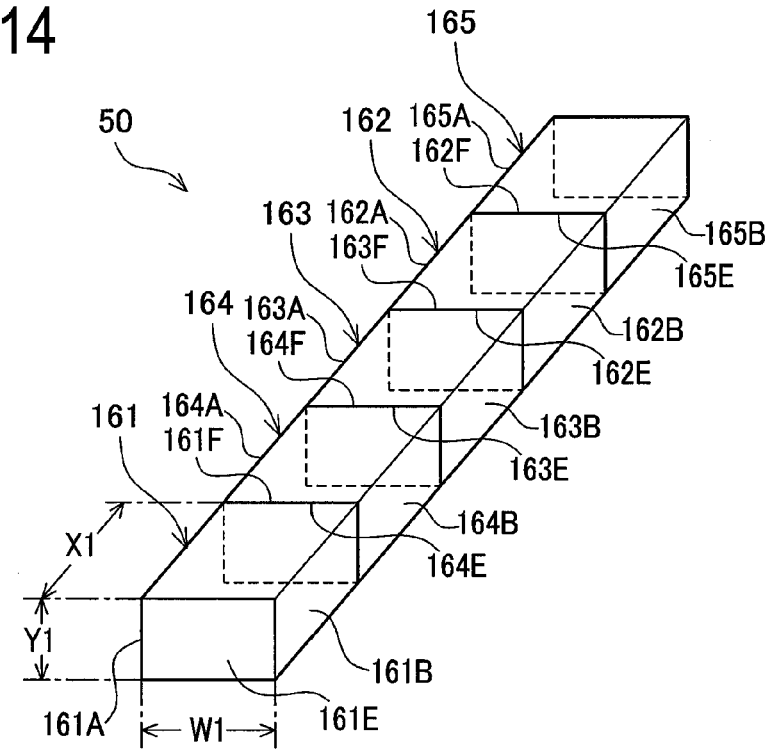
FIG. 14 is an external perspective view of a permanent magnet (1) of a second embodiment.

As shown in FIG. 14, a permanent magnet 50 is produced by interchanging the orders of arrangement of the magnet pieces 162 and 164 of the permanent magnet block 31 shown in FIG. 2. To be concrete, the permanent magnet 50 is configured such that the magnet pieces 162 and 164 of the permanent magnet block 31 shown in FIG. 2 are interchanged in the order of arrangement while keeping their orientations unchanged.

Figure 18:
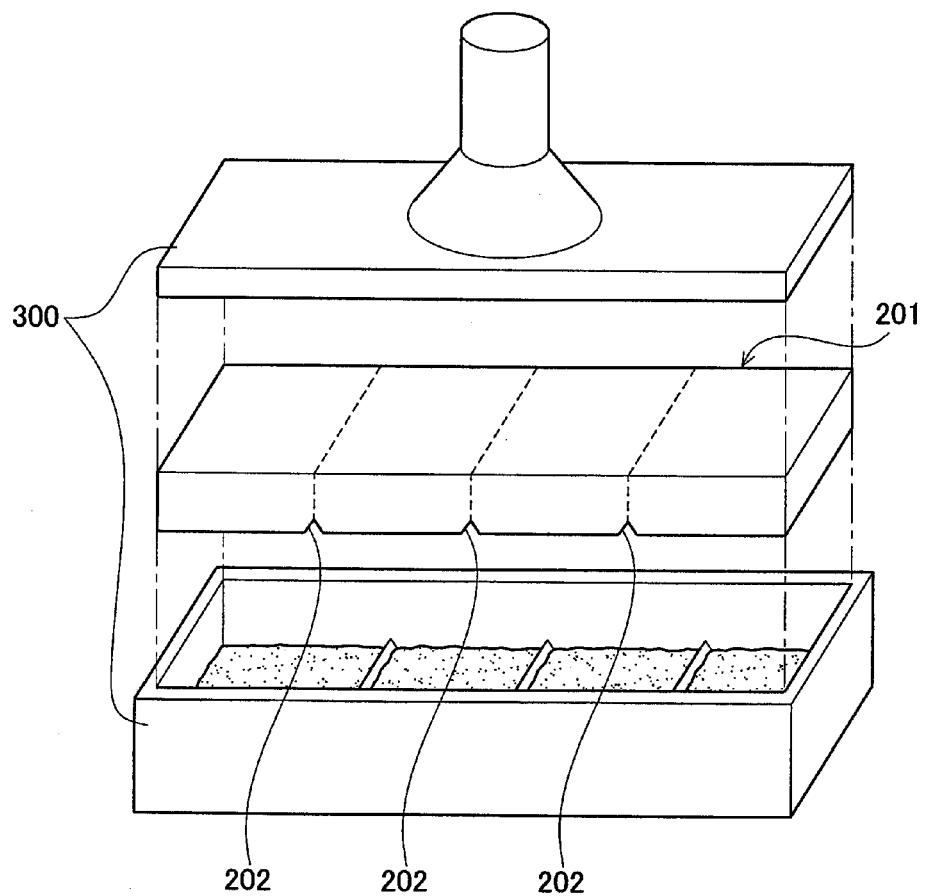
FIG. 18 is a conceptual diagram (2) of a manufacturing process of the conventional permanent magnet.
Figure 19:
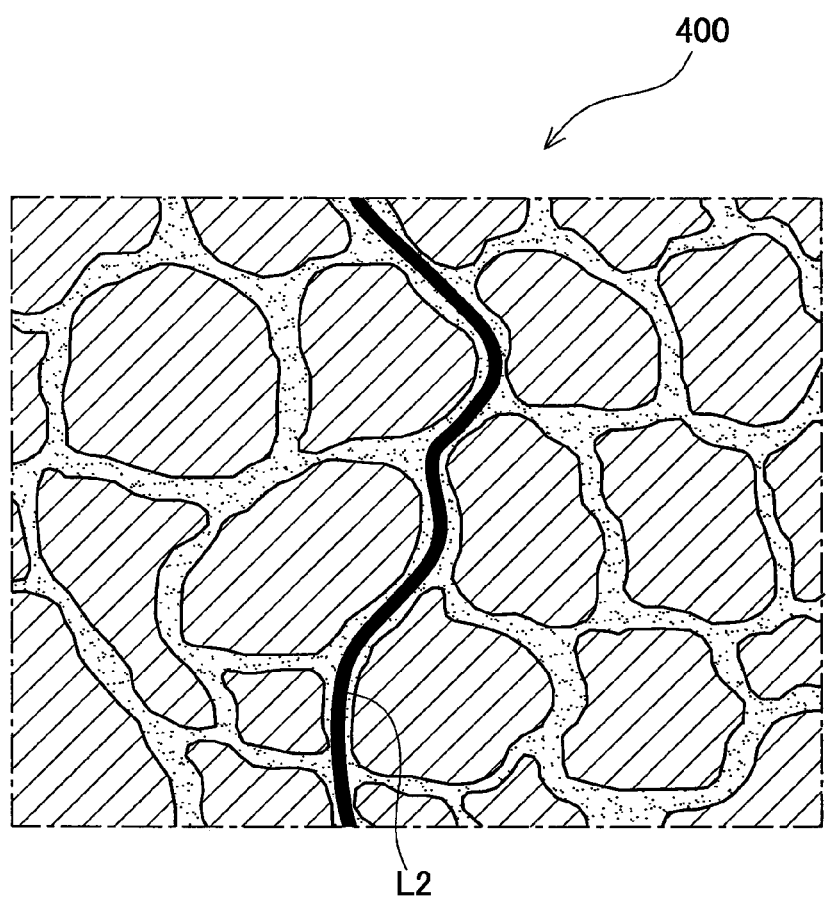
FIG. 19 is an enlarged cross sectional view of fractured surfaces of a permanent magnet block.

By interchanging the orders of arrangement of the magnet pieces 162 and 164, the fractured surfaces being adjacent and facing to each other at the time of fracture as shown in FIG. 18 are placed out of contact with each other. When the orders of arrangement of the magnet pieces 162 and 164 are interchanged, the fractured surface 162F of the magnet piece 162 contacts with the fractured surface 165E and the fractured surface 162E contacts with the fractured surface 163F. Further, the fractured surface 164F of the magnet piece 164 contacts with the fractured surface 163E and the fractured surface 164E contacts with the fractured surface 161F. Accordingly, the fractured surfaces contact with each other, whereas the fractured surfaces being adjacent and facing to each other at the time of fracture no longer contact with each other. Since such fractured surfaces being adjacent and facing each other at the time of fracture do not contact with each other, the contact surfaces decreases, resulting in reduction in the residual ratio of magnet eddy loss.

In FIG. 14, the order of arrangement of the magnet pieces 162 and 164 is changed. As an alternative, the magnet pieces 162 and 164 of the permanent magnet block 31 shown in FIG. 2 may be reversely oriented, for example, to form a permanent magnet 51 shown in FIG. 15. Specifically, when the orientation of the magnet piece 162 is turned around, the fractured surface 162F contacts with the fractured surface 161F and the fractured surface 162E contacts with the fractured surface 163E. Further, when the orientation of the magnet piece 164 is turned around, the fractured surface 164F contacts with the fractured surface 163F and the fractured surface 164E contacts with the fractured surface 165E. Accordingly, the fractured surfaces contact with each other, whereas the fractured surfaces being adjacent and facing to each other at the time of fracture do not contact with each other. Since such fractured surfaces being adjacent and facing to each other at the time of fracture no longer contact with each other, the contact surfaces are decreased and thus the residual ratio of magnet eddy loss can be reduced.

Figure 15:
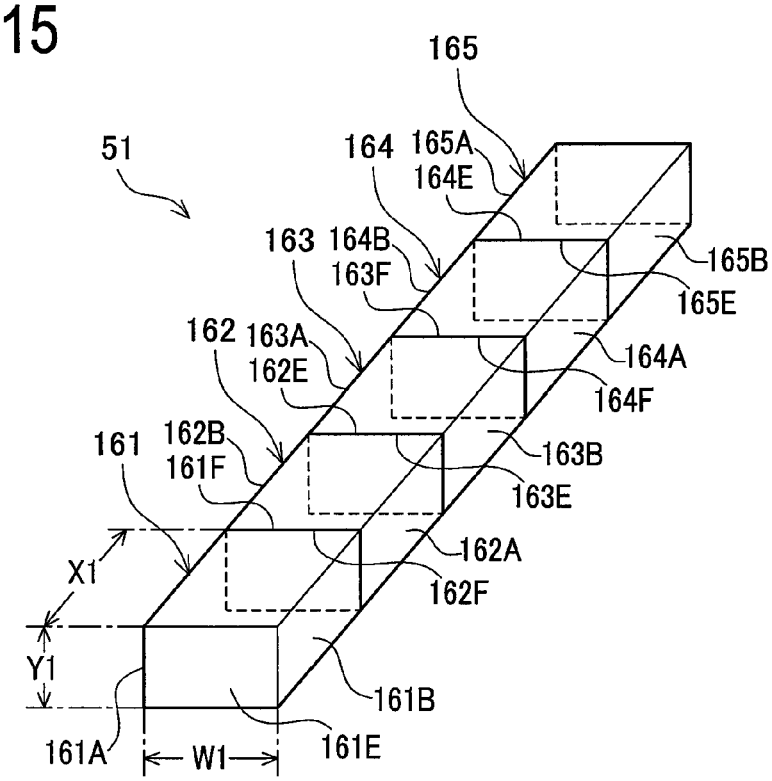
FIG. 15 is an external perspective view of a permanent magnet (2) of the second embodiment.

In the permanent magnet 50 shown in FIG. 14 and the permanent magnet 51 shown in FIG. 15 in the present embodiment, the magnet pieces 162 and 164 are interchanged in position or changed in orientation. As alternatives, the fractured surfaces being adjacent and facing to each other at the time of fracture can be placed out of contact with each other by changing the order of arrangement of other magnet pieces 161, 163, and 165 or changing the orientation thereof. This configuration can also make the contact surfaces smaller and reduce the residual ratio of magnet eddy loss.

According to the motor rotor 11 in this embodiment explained above, the permanent magnets 16 each consisting of separate pieces are mounted one in each slot 15 of the rotor core 12. Therefore, this motor rotor 11 used as a rotor of a concentrated winding motor can reduce the occurrence of eddy-current loss in the permanent magnets 16. Consequently, motor efficiency can be enhanced.

The present invention is not limited to the aforementioned embodiments and may be embodied in other specific forms without departing from the essential characteristics thereof.

For instance, the protruding marks 351 are generated in the fracturing process; however, similar protrusions to the protruding marks may also be formed on purpose. Such protrusions formed on purpose are intended to disperse centrifugal force applied on a permanent magnet.

For instance, the permanent magnets in the present embodiment are embedded in the slots of the motor rotor for use, whereas the permanent magnets may be inserted in the stator 41 shown in FIG. 15. The configuration that the permanent magnets are inserted in the stator 41 can also provide the same operations and effects as in the present embodiment.

DESCRIPTION OF THE REFERENCE SIGNS

11: Motor rotor
15: Slot
16: Permanent magnet
161, 162, 163, 164, 165: Separate permanent magnet piece
161F, 163E, 162F, 163E, 163F, 164E, 164F, 165F: Fractured surface
31: Permanent magnet block
35: Notch
351: Protruding mark
40: Rotary electric machine
41: Stator

The invention claimed is:

1. A permanent magnet including two or more separate permanent magnet pieces each having a rectangular parallelepiped shape with a fractured surface formed when a permanent magnet block is fractured,
wherein the separate permanent magnet pieces include a first separate permanent magnet piece and a second separate permanent magnet piece,
at the time when the permanent magnet block is fractured, the first and second separate permanent magnet pieces are adjacently located and a first fractured surface of the first separate permanent magnet piece and a second fractured surface of the second separate permanent magnet piece are adjacent to each other, and
the permanent magnet is configured such that the first fractured surface of the first separate permanent magnet piece and the second fractured surface of the second separate permanent magnet piece are located in positions where they do not interface each other.

2. The permanent magnet according to claim 1, wherein the first separate permanent magnet piece and the second separate permanent magnet piece are arranged in positions out of contact with each other.

3. The permanent magnet according to claim 1, wherein the first fractured surface of the first separate permanent magnet piece is located in an outer peripheral surface of the permanent magnet.

4. The permanent magnet according to claim 1, wherein the fractured surfaces of the two or more separate permanent magnet pieces are located in an outer peripheral surface of the permanent magnet.

5. The permanent magnet according to claim 4, wherein the fractured surfaces are located in a pair of opposite surfaces of the rectangular parallelepiped shape.

6. A motor rotor or stator in which a rectangular parallelepiped permanent magnet is inserted in a slot, the permanent magnet including two or more separate permanent magnet pieces having fractured surfaces formed when a permanent magnet block is fractured,
- wherein the separate permanent magnet pieces include a first separate permanent magnet piece and a second separate permanent magnet piece,
- at the time when the permanent magnet block is fractured, the first and second separate permanent magnet pieces are adjacently located and a first fractured surface of the first separate permanent magnet piece and a second fractured surface of the second separate permanent magnet piece are adjacent to each other, and
- the permanent magnet is configured such that the first fractured surface of the first separate permanent magnet piece and the second fractured surface of the second separate permanent magnet piece are located in positions where they do not interface, and
- the first fractured surface of the first separate permanent magnet piece is located in an outer peripheral surface of the permanent magnet.

7. The motor rotor or stator according to claim 6, wherein the fractured surfaces of the two or more separate permanent magnet pieces are located in the outer peripheral surface of the permanent magnet.

8. The motor rotor or stator according to claim 6, wherein the fractured surfaces are located in a pair of opposite surfaces of the rectangular parallelepiped shape.

9. A rotary electric machine using a motor rotor in which a rectangular parallelepiped permanent magnet is inserted in a slot, the permanent magnet including two or more separate permanent magnet pieces having fractured surfaces formed when a permanent magnet block is fractured,
- wherein the separate permanent magnet pieces include a first separate permanent magnet piece and a second separate permanent magnet piece,
- at the time when the permanent magnet block is fractured, the first and second separate permanent magnet pieces are adjacently located and a first fractured surface of the first separate permanent magnet piece and a second fractured surface of the second separate permanent magnet piece are adjacent to each other, and
- the permanent magnet is configured such that the first fractured surface of the first separate permanent magnet piece and the second fractured surface of the second separate permanent magnet piece are located in positions where they do not interface, and
- the first fractured surface of the first separate permanent magnet piece is located in an outer peripheral surface of the permanent magnet.

10. The rotary electric machine according to claim 9, wherein the fractured surfaces of the two or more separate permanent magnet pieces are located in the outer peripheral surface of the permanent magnet.

11. The rotary electric machine according to claim 9, wherein the fractured surfaces are located in a pair of opposite surfaces of the rectangular parallelepiped shape.

* * * * *